(12) United States Patent
Chen

(10) Patent No.: US 6,216,758 B1
(45) Date of Patent: Apr. 17, 2001

(54) BICYCLE WHEEL RIM WITH RESILIENT WEAR-RESISTING RINGS TO MINIMIZE WEARING OF A TIRE

(75) Inventor: Chao-Ying Chen, Tainan Hsien (TW)

(73) Assignee: Alex Machine Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 09/294,540

(22) Filed: Apr. 19, 1999

(51) Int. Cl.$^7$ ........................................................ B60C 5/00
(52) U.S. Cl. .................... 152/379.4; 152/381.4; 152/513; 301/95
(58) Field of Search ............... 152/379.3, 379.4, 152/379.5, 381.4, 382, 383, 384, 513; 301/95, 96, 97, 98

(56) References Cited

U.S. PATENT DOCUMENTS 5,820,709 * 10/1998 Matsuda ............................ 152/383 X \* cited by examiner Primary Examiner—Russell D. Stormer
(74) Attorney, Agent, or Firm—Towsend and Townsend and Crew LLP

(57) ABSTRACT

A bicycle wheel rim includes a rim body having an annular spoke-mounting wall and spaced left and right annular tire-retaining walls, and a pair of wear-resisting rings. The spoke-mounting wall has two annular lateral peripheral edges. The left and right annular tire-retaining walls extend integrally, radially, outwardly and respectively from the lateral peripheral edges of the spoke-mounting wall. Each of the tire-retaining walls has an inner surface that faces the other one of the tire-retaining walls to confine a tire receiving space therewith, an outer brake pad contacting surface opposite to the inner surface, and an annular end face distal to the spoke-mounting wall. Each of the tire-retaining walls further has a tire retaining projection, formed at a corner of the end face and the inner surface for engaging a bicycle tire so as to retain the bicycle tire between the tire-retaining walls. The wear-resisting rings are made of a resilient material. Each of the wear-resisting rings extends along the end face of a respective one of the tire-retaining walls, and projects radially and outwardly relative to the end face of the respective one of the tire-retaining walls to prevent the end face from contacting directly the bicycle tire to minimize wearing of the bicycle tire.

4 Claims, 4 Drawing Sheets

BICYCLE WHEEL RIM WITH RESILIENT WEAR-RESISTING RINGS TO MINIMIZE WEARING OF A TIRE

FIELD OF THE INVENTION

The invention relates to a bicycle wheel rim, more particularly to a bicycle wheel rim with resilient wear-resisting rings to minimize wearing of a tire.

BACKGROUND OF THE INVENTION

Referring to FIG. 1, a conventional bicycle wheel rim is shown to include an extruded metal rim body 1 having an annular spoke-mounting wall 11 with two annular lateral peripheral edges 110 for mounting a plurality of spokes 10, and spaced left and right annular tire-retaining walls 12 which extend integrally, radially, outwardly and respectively from the lateral peripheral edges 110 of the spoke-mounting wall 11. Each of the tire-retaining walls 12 has an inner surface 120 that faces the other one of the tire-retaining walls 12 to confine a tire receiving space 14 therewith, an outer brake pad contacting surface 121 opposite to the inner surface 120, and an annular end face 122 that is distal to the spoke-mounting wall 11. Each of the tire-retaining walls 12 further has a tire-retaining projection 123 formed at a corner of the end face 122 and the inner surface 120. The tire-retaining projection 123 is adapted to engage a bicycle tire 13 so as to the retain the bicycle tire 13 between the tire-retaining walls 12.

A disadvantage that results from the use of the conventional bicycle wheel rim resides in that the tire 13 will expand laterally and outwardly relative to the rim body 1 by virtue of the weight of the rider, thereby causing the tire 13 to abut frictionally against the end face 122 of the rim body 1. The situation is aggravated during a braking operation, where the braking pads 16 clamp together the tire retaining walls 12 at the brake pad contacting surfaces 121. As such, wearing and eventual rupturing of the tire 13 can easily occur when the conventional bicycle wheel rim is in use.

SUMMARY OF THE INVENTION

Therefore, the main object of this invention is to provide a bicycle wheel rim with resilient wear-resisting rings to minimize wearing of a tire.

Accordingly, a bicycle wheel rim of the present invention includes a rim body having an annular spoke-mounting wall and spaced left and right annular tire-retaining walls, and a pair of wear-resisting rings. The spoke-mounting wall has two annular lateral peripheral edges. The left and right annular tire-retaining walls extend integrally, radially, outwardly and respectively from the lateral peripheral edges of the spoke-mounting wall. Each of the tire-retaining walls has an inner surface that faces the other one of the tire-retaining walls to confine a tire receiving space therewith, an outer brake pad contacting surface opposite to the inner surface, and an annular end face distal to the spoke-mounting wall. Each of the tire-retaining walls further has a tire retaining projection formed at a corner of the end face and the inner surface and adapted to engage a bicycle tire so as to retain the bicycle tire between the tire-retaining walls. The wear-resisting rings are made of a resilient material. Each of the wear-resisting rings extends along the end face of a respective one of the tire-retaining walls, and projects radially and outwardly relative to the end face of the respective one of the tire-retaining walls so as to be adapted to prevent the end face from contacting directly the bicycle tire to minimize wearing of the bicycle tire.

Preferably, the end face of each of the tire-retaining walls is formed with an annular retaining groove therealong. Each of the wear-resisting rings is received in the annular retaining groove in the end face of the respective one of the tire-retaining walls.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 2:
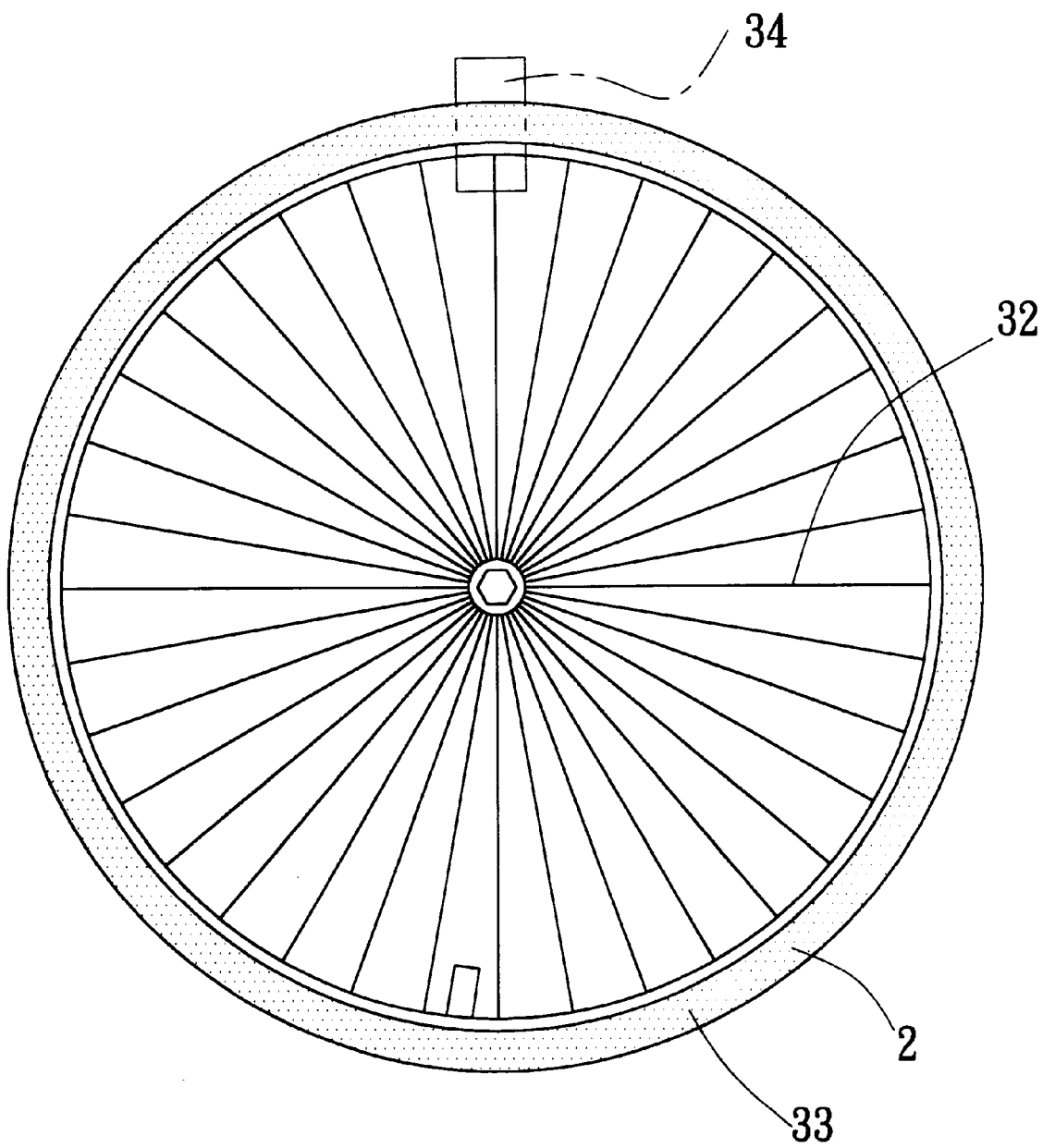
FIG. 2 is a schematic view of a preferred embodiment of a bicycle wheel rim of the present invention when engaged in a bicycle wheel.
Figure 3:
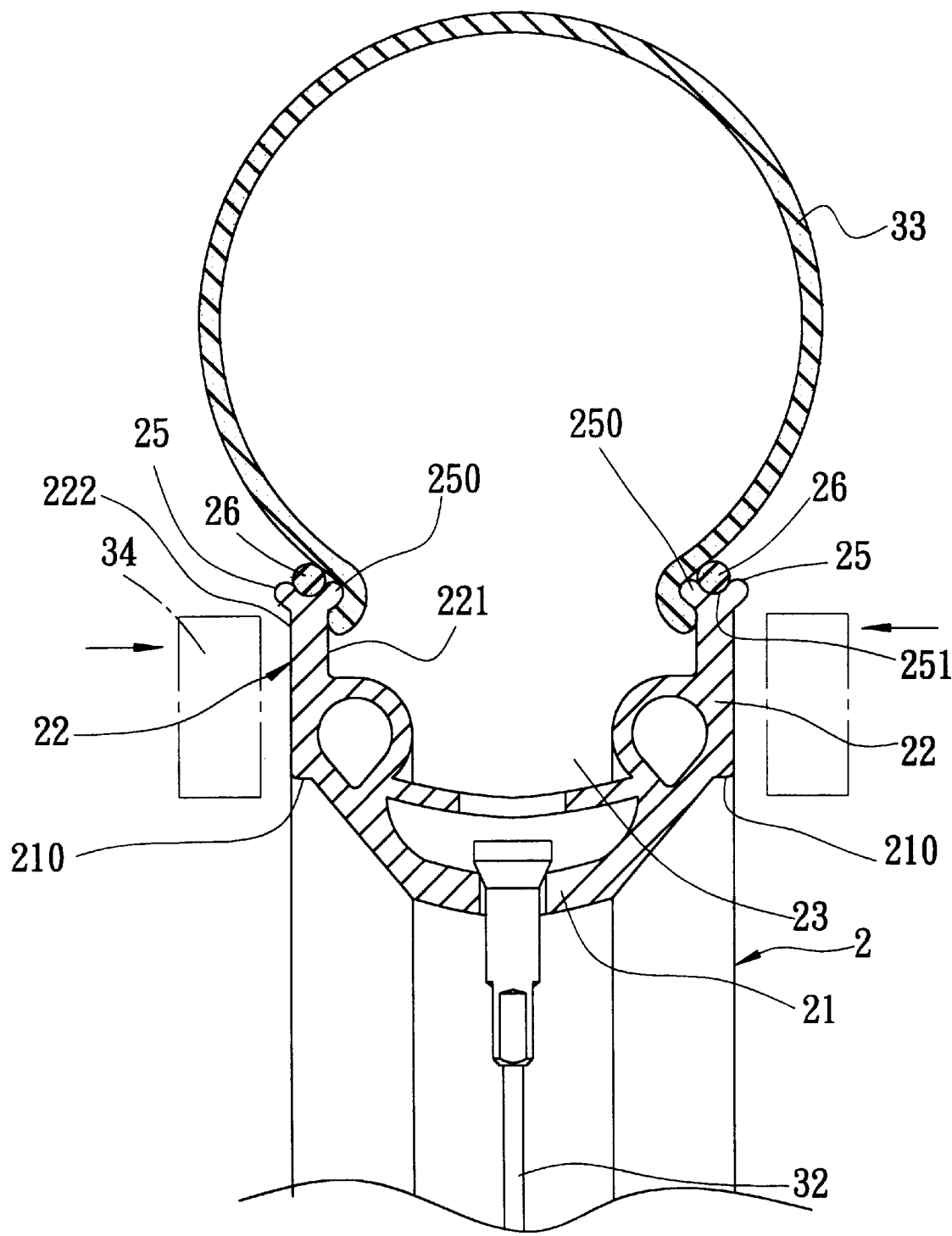
FIG. 3 is a fragmentary and partly sectional view of the preferred embodiment.

Referring to FIGS. 2 and 3, the preferred embodiment of a bicycle wheel rim according to the present invention is shown to include a rim body 2 and a pair of resilient wear-resisting rings 26.

As illustrated, the rim body 2, which is formed from extruded metal in a known manner, has an annular spoke-mounting wall 21 with two annular lateral peripheral edges 210, and spaced left and right annular tire-retaining walls 22 that extend integrally, radially, outwardly and respectively from the lateral peripheral edges 210 of the spoke-mounting wall 21. The spoke-mounting wall 21 is adapted for mounting of spokes 32 thereon, as is known in the art. Each of the tire-retaining walls 22 has an inner surface 221 facing the other one of the tire-retaining walls 22 to confine a tire receiving space 23 therewith, an outer brake pad contacting surface 222 opposite to the inner surface 221, and an annular end face 25 distal to the spoke-mounting wall 21. Each of the tire-retaining walls 22 further has a tire retaining projection 250 formed at a corner of the end face 25 and the inner surface 221. The tire retaining projections 250 cooperatively engage two peripheral edges of a bicycle tire 33 so as to retain the bicycle tire 33 between the tire-retaining walls 22 in a known manner.

The wear-resisting rings 26 are made of a resilient material, such as plastic or rubber. Each of the wear-resisting rings 26 extends along the end face 25 of a respective one of the tire-retaining walls 22, and projects radially and outwardly relative to the end face 25 of the respective one of the tire-retaining walls 22. Thus, the wear-resisting rings 26 prevent the end faces 25 from contacting directly the bicycle tire 33 to minimize wearing of the bicycle tire 33.

In the preferred embodiment, the end face 25 of each of the tire-retaining walls 22 is formed with an annular retaining groove 251 therealong. Each of the wear-resisting rings 26 is received in the annular retaining groove 251 in the end face 25 of the respective one of the tire-retaining walls 22.

Figure 1:
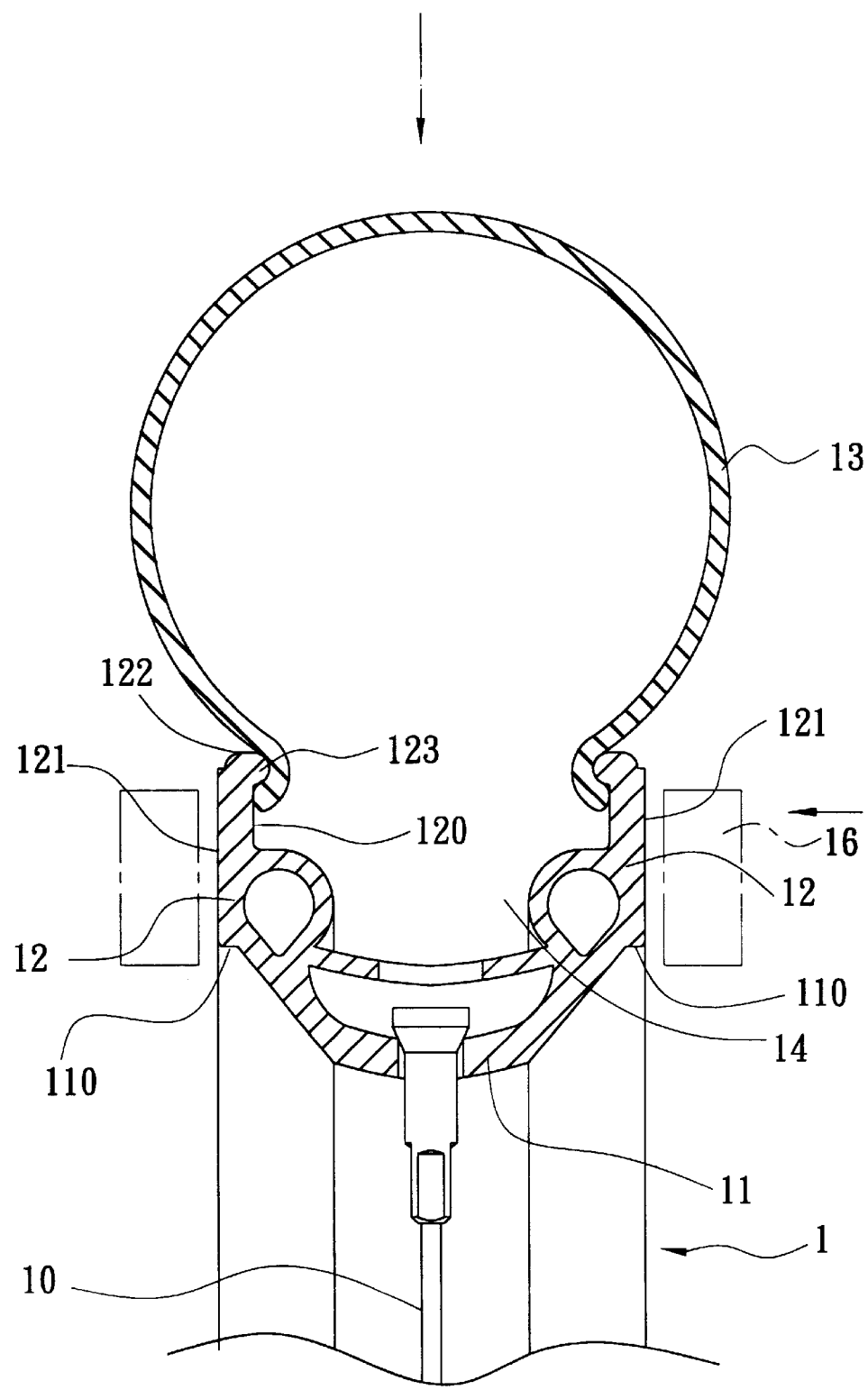
FIG. 1 is a fragmentary and partly sectional view of a conventional bicycle wheel rim employed in a bicycle wheel.
Figure 4:
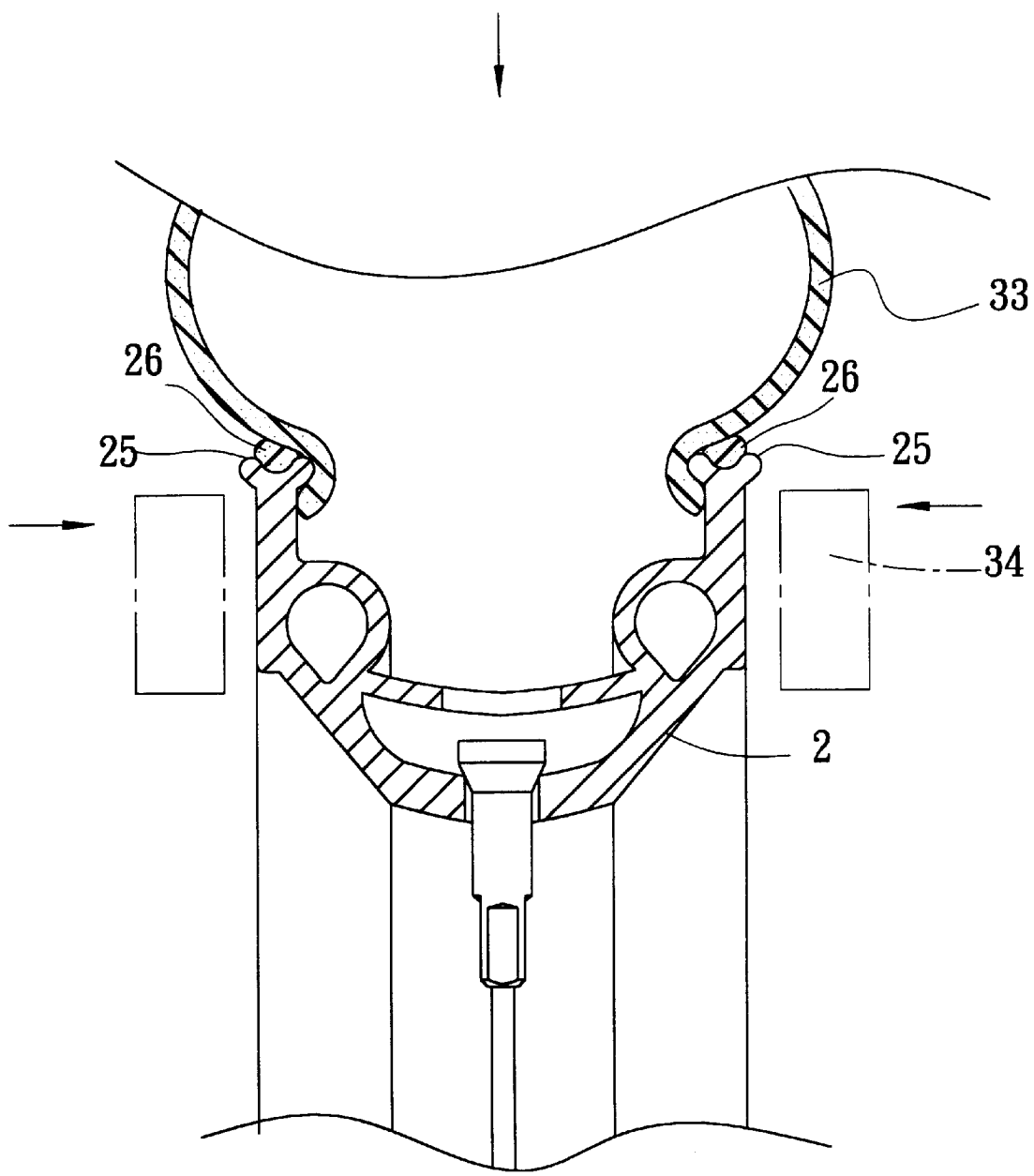
FIG. 4 illustrates how the preferred embodiment functions during a braking operation.

As illustrated in FIG. 4, even when the brake pad contacting surfaces 222 of the rim body 2 are clamped frictionally by brake pad 34 during a braking operation, the wear-resisting rings 26 can prevent frictional contact between the end faces 25 and the bicycle tire 33. As such, the service life of the tire 33 mounted on the bicycle wheel rim of this invention can be longer as compared to that mounted on the conventional bicycle wheel rim shown in FIG. 1.

With this invention thus explained, it is apparent that numerous modifications and variations can be made without departing from the scope and spirit of this invention. It is therefore intended that this invention be limited only as indicated in the appended claims.

I claim:

1. A bicycle wheel rim comprising:

an annular spoke-mounting wall having two annular lateral peripheral edges;

spaced left and right annular tire-retaining walls extending integrally, radially, outwardly, and respectively from said lateral peripheral edges of said spoke-mounting wall, each of said tire-retaining walls having an inner surface facing the other one of said tire-retaining walls to confine a tire receiving space therewith, an outer brake pad contacting surface opposite to said inner surface, and an annular end face distal to said spoke-mounting wall, each of said tire-retaining walls further having a tire retaining projection formed at and protruding from a corner of said end face and said inner surface and adapted to engage a bicycle tire so as to retain the bicycle tire between said tire-retaining walls, each of said tire-retaining walls further having an outer projection formed at and protruding from a corner of said end face and said outer brake pad contacting surface; and a pair of wear-resisting rings made of a resilient material, each of said wear-resisting rings extending along said end face of a respective one said tire-retaining walls and projecting radially and outwardly relative to said end face of the respective one of said tire-retaining walls so as to be adapted to prevent said end face from contacting directly the bicycle tire to minimize wearing of the bicycle tire;

wherein said end face of each of said tire-retaining walls is formed with an annular retaining groove therealong, each of said wear-resisting rings being received in said annular retaining groove in said end face of the respective one of said tire-retaining walls, said annular retaining groove being formed between said tire retaining projection and said outer projection.

2. The bicycle wheel rim of claim 1 wherein the tire retaining projection and the outer projection are rounded projections.

3. The bicycle wheel rim of claim 1 wherein the pair of wear-resisting rings are circular in cross-section.

4. The bicycle wheel rim of claim 1 wherein the pair of wear-resisting rings are detachably connected with the annular spoke-mounting wall.

* * * * *